US010881096B1

(12) United States Patent
Sweeney et al.

(10) Patent No.: US 10,881,096 B1
(45) Date of Patent: Jan. 5, 2021

(54) MOTION SENSING NUISANCE FAUNA DETERRENT

(71) Applicants: Jeffrey Paul Sweeney, Stratford, IA (US); Laura Ann Baker-Sweeney, Stratford, IA (US)

(72) Inventors: Jeffrey Paul Sweeney, Stratford, IA (US); Laura Ann Baker-Sweeney, Stratford, IA (US)

( * ) Notice: Subject to any disclaimer, the term of this patent is extended or adjusted under 35 U.S.C. 154(b) by 0 days.

(21) Appl. No.: 16/021,090

(22) Filed: Jun. 28, 2018

(51) Int. Cl.
*G08B 23/00* (2006.01)
*A01M 29/16* (2011.01)
*A01M 29/06* (2011.01)

(52) U.S. Cl.
CPC ............ *A01M 29/16* (2013.01); *A01M 29/06* (2013.01); *A01M 2200/00* (2013.01)

(58) Field of Classification Search
CPC ..... A01M 29/16; A01K 15/023; A01N 25/02; G08B 23/00
USPC .................................. 340/573.2, 573.1, 541
See application file for complete search history.

(56) References Cited

U.S. PATENT DOCUMENTS

| 5,892,446 A * | 4/1999 | Reich | A01K 15/02 119/720 |
| 5,917,409 A * | 6/1999 | Wang | G08B 29/24 340/506 |
| 6,615,770 B2 * | 9/2003 | Patterson | A01K 15/021 119/719 |
| 6,943,685 B2 * | 9/2005 | Seo | G08B 13/191 340/541 |
| 7,690,146 B2 * | 4/2010 | Jong | A01M 29/16 116/22 A |
| 7,782,199 B2 * | 8/2010 | Issokson | G08B 13/189 340/541 |
| 8,281,747 B1 * | 10/2012 | Few | A01K 15/023 119/719 |
| 8,997,697 B1 * | 4/2015 | Dailey | A01M 29/06 119/719 |

OTHER PUBLICATIONS

Rotenberk, Lori, "Hay, Man: The Curious Life and Times of Scarecrows", Modern Farmer, May 28, 2014, http://bit.ly/HayMan.
(Continued)

*Primary Examiner* — Toan N Pham
(74) *Attorney, Agent, or Firm* — Gugliotta & Gugliotta LPA (57) ABSTRACT

A motion sensing nuisance fauna deterrent is provided for abating animal nuisances from disturbing a target flora. A sensing platform having a fixed base portion provides a stationary support platform. A rotating base platform has proximity detection sensors positioned about a periphery for proving non-contact proximity sensing capable of detecting a nuisance animal. A speaker provides an audible output in response to an actuation initiated the proximity sensors. A decoy secured to the platform is in the form of a canine. By placing at a detection perimeter and directed outward, an approach of a nuisance animal initiates an audible alarm to deter the approach of the nuisance animal with a non-lethal effect. The instant abstract is neither intended to define the invention disclosed in this specification nor intended to limit the scope of the invention in any way.

19 Claims, 6 Drawing Sheets

(56) References Cited

OTHER PUBLICATIONS

Adams, John E., "Guard dogs scare the bad people. The history of the guard dog.", Barkley and Paws, http://bit.ly/Dogscare.
"The Pros & Cons of Guard Dogs", Burglary.com, http://bit.ly/k9prosandcons.
Harris, Tom, "How Burglar Alarms Work", HowStuffWorks, http://bit.ly/HSWBurglaralarms.
"The Beginner's Guide to Motion Sensors", Safewise, http://bit.ly/MoSe101.

* cited by examiner

MOTION SENSING NUISANCE FAUNA DETERRENT

RELATED APPLICATIONS

There are no previously filed, nor currently any co-pending applications, anywhere in the world.

BACKGROUND OF THE INVENTION

1. Field of the Invention

The present invention relates generally to agricultural type pest deterrents and, more particularly, to a motion sensing alarm system for the deterrent of animal nuisances for residential outdoor use.

2. Description of the Related Art

Farmers have, since the dawn of agriculture, fought battles with crows and other animals trying to poach seeds and plants from the farmer's crops. Following the Great Plague, farmers used other humans, keeping watch in straw huts, to guard their crops.[1] As farms got larger and larger, it became less practical for humans to micro manage the farm in order to scare away predators, thus giving birth to the scarecrow.[1] Some historians believe that the scarecrow was also used as a warning sign against would-be trespassers.[1] In addition to scaring away crows, farmers use scarecrows to scare away doves, grackles, red wing blackbirds, sparrows, turkeys, quail, and other pests that would otherwise feast on fresh seed and sugar found in corn and other crops.[1]

Similarly, humans have bred certain breeds of dogs specifically for their watching and guarding ability. This stereotypical guard dog was, in fact, originally bred in an effort to protect people who were carrying gold and other valuable goods.[2] From there, these desirable traits grew in popularity. Today, guard dogs are generally used to guard one's real property.[2] Additionally, guard dogs are used on business premises to protect investments from intruders and on farms to protect livestock from predators.[2]

A guard dog is effective because it is bread to bark loudly when it senses an intruder in its vicinity or when it senses something else to be wrong.[2] While a watch dog is trained and bred to alert its owner of an intruder, a guard dog is trained in bread to attack and/or restrain an intruder.[2] Through this, intruders will be frightened away from the property.

However, some people are hesitant to own a guard dog due to the severe down sides. For example, guard dogs may inadvertently harm one's welcomed guests.[3] If a guard dog of a strong breed attacks an innocent bystander near one's property, in addition to the bodily harm that may be caused the owner is opened up to liability.[3] Additionally, the intruder could conceivably injure the dog. If the intruder is of a violent disposition, they may attack or even kill the dog.[3] Another concern is that the intruder could steal the dog by "bribing" the dog with food and earn its loyalty.[3] Further, when the dog is not at the home, such as when on a walk or on vacation with its owner, it is unable to provide protection of the premises.[3] Notably, guard dogs cannot summon law enforcement, but rather merely barks loudly and/or attacks the intruder.[3] Finally, guard dogs do not, at this time, provide video monitoring.[3]

Another option for protecting one's premises is to install a burglar alarm system. An electric circuit system is a type of burglar alarm that is built into the premise's entryway.[4] The electric circuit detects the opening of a door or window.[4] In a closed-circuit system, the electric circuit is closed upon the door being shut, so that whenever the door is closed electricity can flow throughout the circuit.[4] When a door or window is opened, however, the electricity stops and the alarm is triggered.[4] An open-circuit system, however, allows the electricity to begin flowing when the window or door is opened, thus triggered the alarm.[4]

Another type of burglar alarm leverages the use of a small button acting as a switch, which is embedded in the doorframe.[4] This button is activated when the door pushes it in.[4] When the door is opened, the button is released and it sounds the alarm.[4] Some other burglar alarms leverage the use of motion detectors to determine an intruder's presence.

There are various types of motion detector technology on the market. Passive infrared motion detectors measure body heat and detect movement in the vicinity, thus creating a protective grid.[5] When a moving object interferes with a predetermined number of grid zones and the infrared engird levels rapidly fluctuate, the sensor is tripped and the alarm sounds.[5] Microwave motion detectors send out microwave pulses and measure these pulses' reflections off of moving objects in the vicinity.[5] Another type of motion detector combines passive infrared sensors with microwave sensors to decrease the likelihood of false alarms, by requiring both sensors be activated before the alarm sounds.[5] Area reflective motion sensors emit infrared rays from a light emitting diode and measure the distance to an object within the vicinity by measuring the reflection of these infrared rays.[5] Ultrasonic motion detectors emit ultrasonic waves in pulses and measures these waves' reflections off of moving objects in the vicinity, thus triggering the alarm.[5] Finally, vibration motion detectors measures physical vibrations in the vicinity.[5] When vibrations are detected, these motion detectors activate a switch which causes the alarm to sound.[5]

Some times the cost of the item protected does not outweigh the cost of protection. This may be especially true for homeowners that are merely protecting their flowers, shrubs, or gardens from deer or rabbit. Consequently, a need exists for providing a nuisance animal deterrent outdoors without the costs or drawbacks of owning a dog, but with similar deterrent benefits.

SUMMARY OF THE INVENTION

It is thus an object of the present invention to deter wildlife and intruders from trespassing upon one's property.

It is a feature of the present invention to provide motion-sensor activated speakers which play sounds, coupled with movement, to deter wildlife and intruders from trespassing upon property.

The present invention provides a system and method for abating animal nuisances from disturbing a target flora. A sensing platform includes a fixed base portion adapted to provide a stationary physical support platform for mechanically affixing to a ground securement mechanism. At least one proximity detection sensor is positioned equally spaced about the periphery, with each said sensor directed radially outward in a target detection arc about the sensing platform. Each sensor is selected for proving non-contact proximity sensing capable of detecting a selected live target including said nuisance animal. A speaker for a controlled audible output is included in response to a controlled actuation initiated by said at least one proximity detector. A decoy housing is rotatably affixed to an upper surface of the sensing platform, and a motion actuation mechanism, such as servo motor or similar or equivalent mechanism, effectuates a rotation movement of the decoy housing relative to the base. A ground securement mechanism is secured to a lower surface of said sensing platform mechanism and adapted to provide for placement of the system into a ground and includes a vertical shaft affixed perpendicular to the lower surface of the base at an upper terminus in a rotatable manner such that the base may be radially positioned to a selected direction once secured to the ground. Animal nuisances are abated from disturbing a target flora by placing of the sensing platform at a detection perimeter for monitoring the detection perimeter with at least one proximity detector positioned on and directed outward such that the detection of an approach of a nuisance animal within a selected distance from the detection perimeter thereby initiates an alarm timer. After continuous detection of the nuisance animal through a timer threshold, an audible alarm is annunciated.

The audible alarm is formed of a sound designed to deter the approach of the nuisance animal with a non-lethal effect.

Further objects, features, elements, and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 5b is a schematic of a process flow diagram for the method of FIG. 5a.

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Referring now to the drawings, wherein like reference numerals indicate the same parts throughout the several views, a motion sensing nuisance fauna deterrent system, generally noted as 10, is shown according to the preferred embodiment of the present invention. The system 10 includes, mainly, a sensing platform 12, a rotatable decoy housing 14, and a ground securement mechanism 16.

The sensing platform 12 includes a fixed base portion 18 that may provide a stationary physical support platform 20 for mechanically affixing to the ground securement mechanism 16. The base platform 20 may further provide a containment housing 22 for containing a main logic board and operational speakers and/or motors (not shown) as will be described in greater detail below. The base platform 20 may further form a circumscribing vertical sidewall 24 bounding the outer periphery of the base 18 and platform 20. As shown herein the base 18, platform 20 and sidewall 24 may be configured in a generally cylindrical shape for both ease of depiction and efficiency of shape and volume. It should be understood by a person having ordinary skill in the relevant art, in light of the present teachings, that such an overall shape is merely a design choice, and that other shapes and configurations may be effectively selected within the broad range of equivalents of the present invention.

The sidewall 24 provides a supporting surface about its periphery for at least one proximity detection sensor 30. As shown in the present exemplary configuration, four separate proximity detection sensors 30 are shown herein positioned equally spaced about the periphery of the sidewall 24. In any selected design configuration, each sensors 30 is intended to be directed toward a target detection arc about the sensing platform 12. As shown in the present exemplary configuration, a series of four spaced sensors 30 are utilized with each sensor covering approximately 90° of the sensing area.

Each sensors 30 may be selected for proving non-contact proximity sensing capable of detecting a selected live target, and especially those herbivorous fauna that may be detrimental to decorative landscape or garden plants (e.g. rabbit, deer, etc.) or omnivorous fauna in search of the same or other food sources such as yet uncollected household waste (e.g. raccoon, bear, etc.). It is felt that the use of Passive Infrared (PIR) sensors or heat Sensor in order to detect a motion of such wildlife may provide effective target detection.

The decoy housing 14 is located affixed to an upper surface of the platform 20. The ground securement mechanism 16 is located affixed to a lower surface of the base 18. The ground securement mechanism 16 may be attachable at an upper end to the lower surface of the base 18 such that the mechanism 16 may be secured to the ground first and then the base 18 attached thereafter. It is anticipated that various functional equivalents may be utilized for ground securement, and such a mechanism is to be widely construed to provide any functional affixment to allow the housing 14 to be secured, positioned and directed within a target area.

The decoy housing 14 is intended to be formed having an outer aesthetic design to provide the impression of a predator animal to those species identified as selected live target (s). By way of a specific included example, but not meant as an exclusive limitation, for an intended use about urban or suburban homes for deterrent against foraging of garden or ornamental plants from deer, rabbits or the like, or for deterrent against foraging of residential accumulated, but yet uncollected waste from raccoon or the like, the decoy housing 14 provides an outer aesthetic having the appearance of a canine predator, such as a domestic dog or wild canine such as wolf, coyote or fox. Such an aesthetic is specifically provided to provide a visual deterrent to such unwanted urban or suburban nuisances. The decoy housing 14 may be of a portion of the canine, as shown with a bust of domestic dog, or may be of the entire body of the canine.

The ground securement mechanism 16 is located affixed to a lower surface of the base 18 and is specifically adapted to provide for placement of the system 10 into the ground, preferably about the bedding or gardens of suburban or urban landscapes. The securement mechanism 16 may include a vertical shaft 34 affixed perpendicular to the lower surface 22 of the base 18. An upper terminus 36 of the shaft 34 may be affixed in a rotatable manner such that the base 18 may be radially positioned to a selected direction once secured to the ground. A lower terminus 38 of the shaft 34 may further include plurality of tines 40 to form a spike to aid in securing into or removing from a ground attachment position.

With the decoy housing 14 positioned at the upper surface of platform 20 in a rotatable manner, and the base 18 secured to the ground by the attachment mechanism 16 may be directionally positioned for directional positioning of the platform 20. The decoy housing 14 may optionally further include a rotational drive mechanism, such as, for example, a servo motor, a rotary actuator or equivalent servo device that allows for controlled movement of the decoy 14 in a reciprocating, back and forth or directional manner. The ability to move the decoy 14 toward a sensed motion is intended to provide a more realistic movement of the device so as to emulate a dog or similar guard animal. The drive mechanism may thereby be operationally controlled in response to detection by any sensor 30, moving the platform 20 to either the left or right, subject to detection of various targets.

Figure 1:
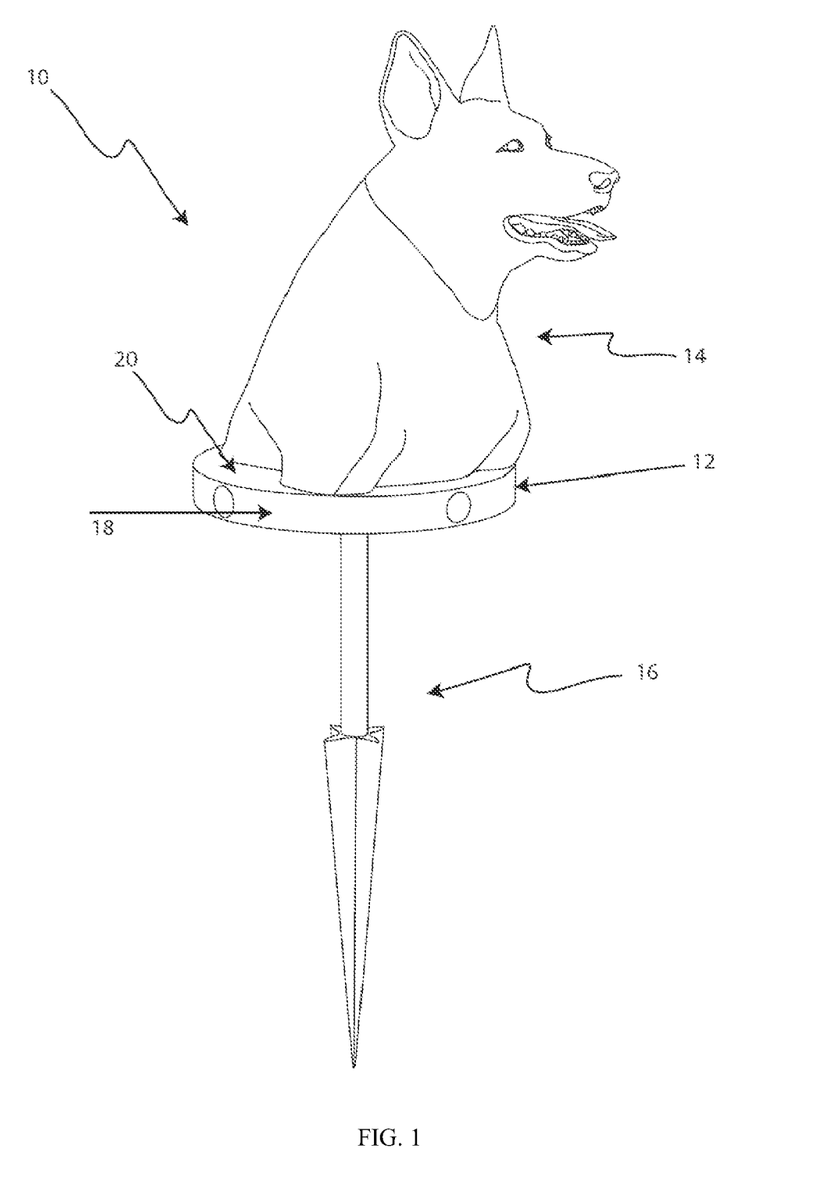
FIG. 1 is a right front perspective of a motion sensing nuisance fauna deterrent system according to a preferred embodiment of the present invention.
Figure 2:
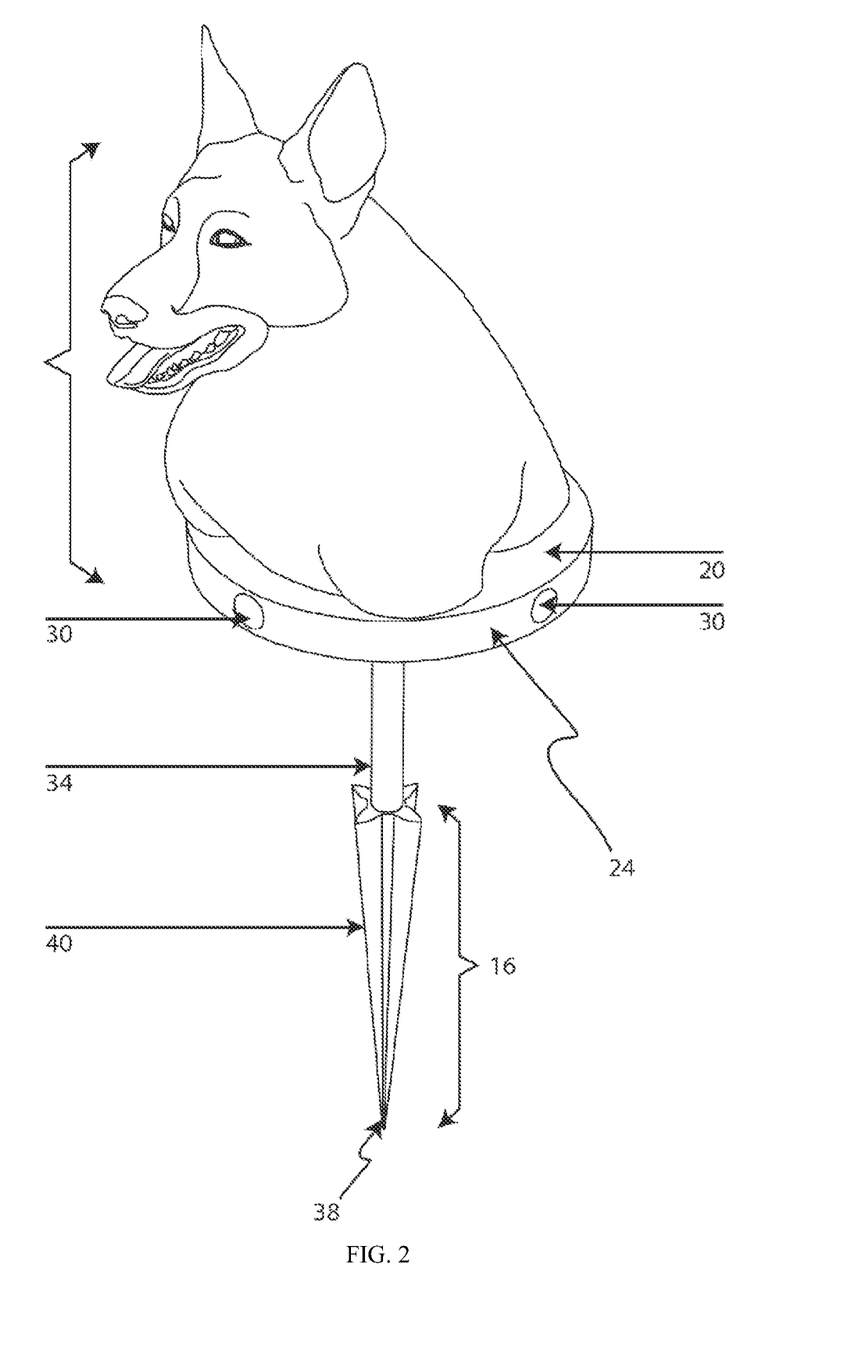
FIG. 2 is a left front perspective thereof.
Figure 3:
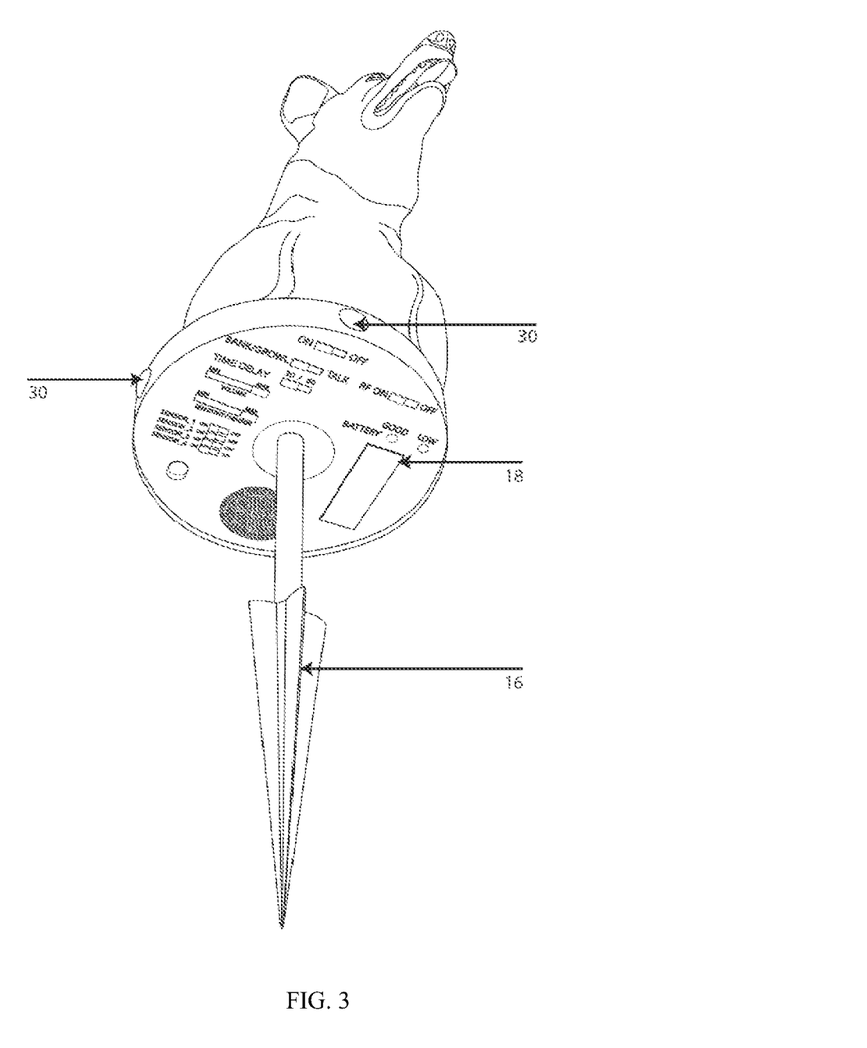
FIG. 3 is a right front lower perspective view thereof.
Figure 4:
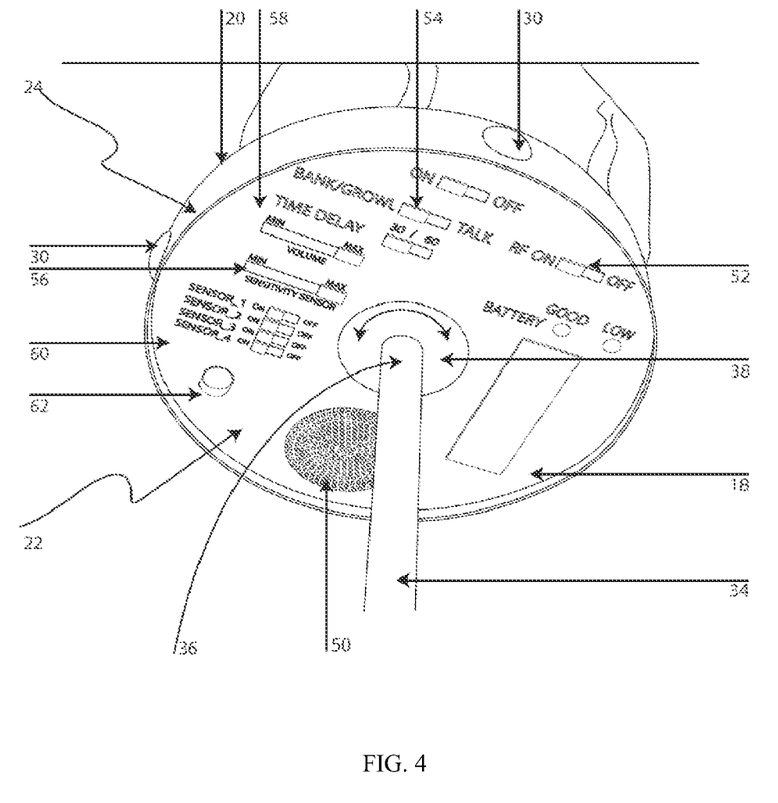
FIG. 4 is a partial lower detail view thereof.

As shown best in conjunction with FIG. 4, the system 10 further includes a speaker 50 for a controlled audible output in response to a controlled actuation initiated by one or more sensor 30. Upon initiation of the sensors 30 with a sensor on/off control 52, an audible output from the speaker 50 may be selected using an audio control 54, shown herein as a choice between an emulated canine sound (i.e. bark, growl, etc.), or an different selected audio messaging, such as a recorded or a prerecorded statement, sound, messaging, etc.

The system 10 may further include other operational controls. These may include volume controls 56 for regulating a volume of an output of the speaker 50, or a controller time delay 58 for delaying the shut off time of the device after an initiation. Further controls may exist, such as on/off control 60 for any individual sensor 30 or a test actuation 62 for manual testing of a selected controlled audio output. It should be understood by those of ordinary skill in the relevant art, in light of the present invention, that various other operational controls or permutations thereof may be mere design choices made within the scope of the overall equivalent of the current teachings.

2. OPERATION OF THE PREFERRED EMBODIMENT

Figure 5A:
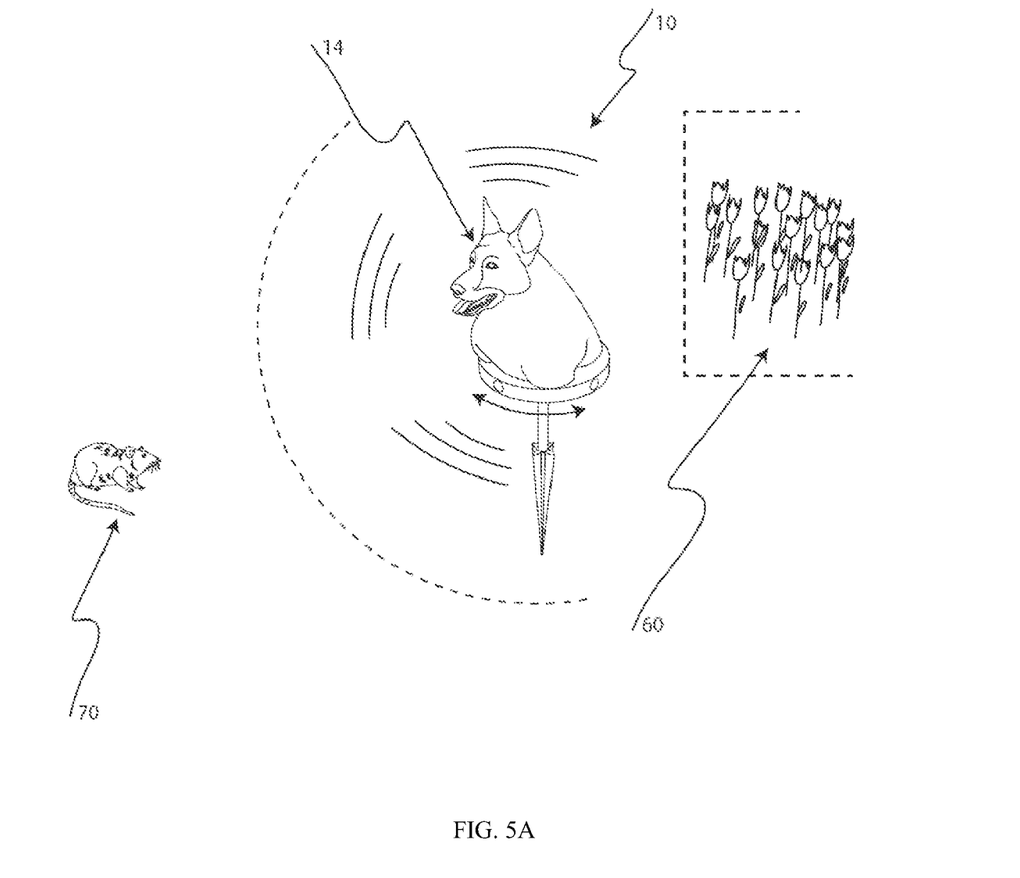
FIG. 5a is a schematic of showing an exemplary method of use of the system 10.
Figure 5B:
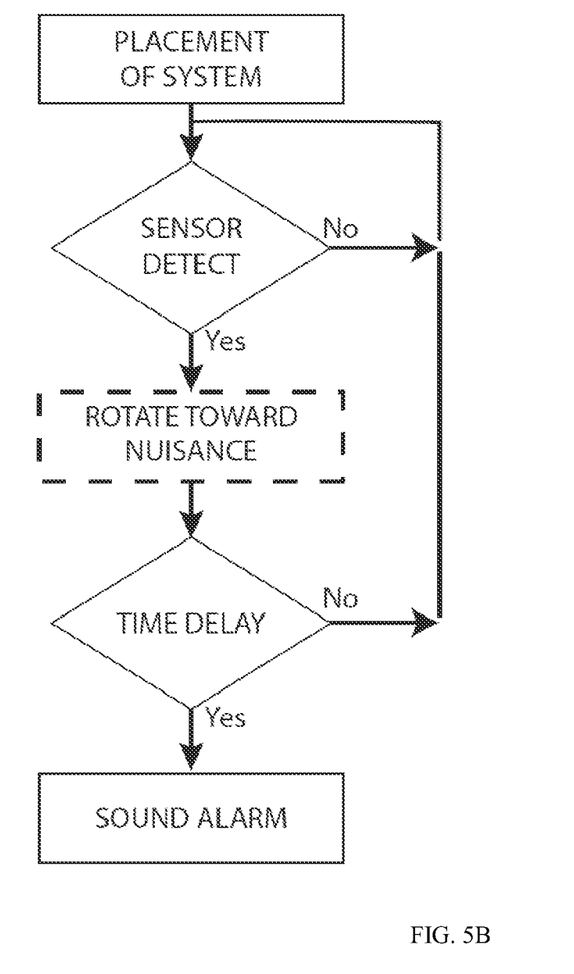

As best shown in conjunction with FIGS. 5a and 5b, in operation of the preferred embodiment system 10 is positioned 100 about or at a perimeter of plant or an area 60 (e.g. flower bed, garden, etc.) or such protected target 60 and anticipated nuisance animals 70 (e.g. deer, rabbits, etc.). Activated at the perimeter of such a protected target 60, the IR sensors continue to monitor for motions until one or more sensors 30 is actuated 200. The decoy 14 may optionally be rotated toward the direction of the nuisance 300. The selected time delay 400 is initiated, and if the nuisance is abated outside the range of the sensors no additional action need be initiated. If the nuisance does not abate and the nuisance animals 70 continue to approach the protected plant or area 60, the alarm in annunciated 500 and the speaker 50 audibly outputs the programmed alarm, such as the recorded or prerecorded barking of a canine. Such an audible alarm is adapted to specifically elicit a non-lethal flight response in the nuisance animal 70 away from the protected area 60.

In conjunction with the features and elements described herein, additional functionality is anticipated including, but not limited to, indoor use or network use. When used indoors, it is envisioned that the system 10 may be supported independently and positioned at a door or window or elsewhere where motion may be detected and responded to. When used as part of a network, it is envisioned that a plurality of such systems 10 may be used in a manner in which each device 10 may communicate wirelessly, such as through RF communication or other similar or equivalent methods, such that upon detection of motion by one unit, operation initiation of other units may be affected. By way of example, and not as a limitation, a plurality of devices 10 may be activated such as to all rotate directionally toward a sensed motion, or to all activate sound when any such networked device 10 is actuated. With such networking capabilities, may variations of operation may be envisioned that may be adapted to particular uses.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A method for abating animal nuisances from disturbing a target flora comprising:
    a. placing of a plurality of motion actuated audible annunciators in a spaced manner about at a detection perimeter;
    b. monitoring said detection perimeter with a plurality of proximity detectors each positioned on and directed outward from each said motion actuated audible annunciator;
    c. detecting an approach of a nuisance animal by at least one said proximity detector within a selected distance from said detection perimeter and thereby initiating an alarm timer; and
    d. upon continuous detection of said nuisance animal through a timer threshold, wirelessly communicating among all said plurality of proximity detectors and annunciating an audible alarm from said plurality of motion actuated audible annunciators;
wherein said audible alarm is formed of a sound designed to deter the approach of the nuisance animal with a non-lethal effect.

2. The method of claim 1, wherein said detection perimeter encompasses a plant area perimeter incorporating said target flora comprising ornamental or crop plants.

3. The method of claim 2, wherein said detection perimeter is located in an urban or suburban residential setting.

4. The method of claim 3, wherein
    said nuisance animal is selected from a group consisting of: deer; rabbit; raccoon; marmots; other rodents; ruminant mammals; procyonides; and Leporidae; and
    said sound is selected as one identified by said nuisance animal as a predator or deterrent.

5. The method of claim 4, wherein said predator or deterrent is selected from a group consisting of: recorded canine sounds; prerecorded canine sounds; recorded human sounds; and prerecorded human sounds.

6. The method of claim 4, wherein said canine is selected from a group consisting of: wolves; coyotes; and domestic dogs.

7. The method of claim 1, wherein each said motion actuated audible annunciator comprises:
    a sensing platform including a speaker for a controlled audible output in response to a controlled actuation initiated by said at least one of said plurality of proximity detectors;
    a decoy housing secured to an upper surface of said sensing platform; and
    a ground securement mechanism secured to a lower surface of said sensing platform mechanism and adapted to provide for placement of the system into a ground and includes a vertical shaft affixed perpendicular to the lower surface of the base at an upper terminus in a rotatable manner such that the base may be radially positioned to a selected direction once secured to the ground.

8. The method of claim 7, wherein each said sensing platform further comprises:
    a fixed base portion adapted to provide a stationary physical support platform for mechanically affixing to the ground securement mechanism;
    a rotating base platform forming a circumscribing vertical sidewall bounding an outer periphery of the base;
    at least one proximity detection sensor positioned equally spaced about the periphery, each said sensor directed radially outward in a target detection arc about the sensing platform, each sensor selected for proving non-contact proximity sensing capable of detecting a selected live target including said nuisance animal.

9. The method of claim 8, wherein said at least one detection sensor comprises two, three or four passive infrared (PIR) sensors or heat sensors.

10. The method of claim 9, wherein said decoy housing is formed having an outer aesthetic providing an impression by the live target animals of a predator animal.

11. The method of claim 10, wherein said aesthetic is either a bust or an entire body and the predator animal is selected from a group comprising: a domestic dog; a wolf; a coyote; and a fox.

12. The method of claim 6, wherein said motion actuated audible annunciator comprises:
    a sensing platform including a speaker for a controlled audible output in response to a controlled actuation initiated by said at least one proximity detector;
    a decoy housing secured to an upper surface of said sensing platform; and
    a ground securement mechanism secured to a lower surface of said sensing platform mechanism and adapted to provide for placement of the system into a ground and includes a vertical shaft affixed perpendicular to the lower surface of the base at an upper terminus in a rotatable manner such that the base may be radially positioned to a selected direction once secured to the ground.

13. The method of claim 12, wherein said sensing platform further comprises:
    a fixed base portion adapted to provide a stationary physical support platform for mechanically affixing to the ground securement mechanism;
    a rotating base platform forming a circumscribing vertical sidewall bounding an outer periphery of the base;
    at least one proximity detection sensor positioned equally spaced about the periphery, each said sensor directed radially outward in a target detection arc about the sensing platform, each sensor selected for proving non-contact proximity sensing capable of detecting a selected live target including said nuisance animal.

14. The method of claim 13, wherein said at least one detection sensor comprises two, three or four passive infrared (PIR) sensors or heat sensors.

15. The method of claim 14, wherein said decoy housing is formed having an outer aesthetic providing an impression by the live target animals of a predator animal.

16. The method of claim 15, wherein said aesthetic is either a bust or an entire body and the predator animal is selected from a group comprising: a domestic dog; a wolf; a coyote; and a fox.

17. A motion sensing nuisance fauna deterrent for abating animal nuisances from disturbing a target flora comprising:
at least two sensing platforms in operative and interactive wireless communication with each other, wherein each said sensing platform further comprises:
a fixed base portion adapted to provide a stationary physical support platform for mechanically affixing to a ground securement mechanism;
a rotating base platform forming a circumscribing vertical sidewall bounding an outer periphery of the base;
at least one proximity detection sensor positioned equally spaced about the periphery, each said sensor directed radially outward in a target detection arc about the sensing platform, each sensor selected for proving non-contact proximity sensing capable of detecting a selected live target including said nuisance animal; and
a speaker for a controlled audible output in response to a controlled actuation initiated by said at least one proximity detector;
a decoy housing secured to an upper surface of said sensing platform; and
said ground securement mechanism secured to a lower surface of said sensing platform mechanism and adapted to provide for placement of the system into a ground and includes a vertical shaft affixed perpendicular to the lower surface of the base at an upper terminus in a rotatable manner such that the base may be radially positioned to a selected direction once secured to the ground;
wherein upon continuous detection of said nuisance animal by any said sensing platform through a timer threshold, an audible alarm is annunciated by all said sensing platforms.

18. The motion sensing nuisance fauna deterrent for abating animal nuisances from disturbing a target flora of claim 17, wherein
said detection perimeter is located in an urban or suburban residential setting;
said nuisance animal is selected from a group consisting of: deer; rabbit; raccoon; marmots; other rodents; ruminant mammals; procyonides; and leporidae; and
said sound is selected as one identified by said nuisance animal as a predator or deterrent.

19. The motion sensing nuisance fauna deterrent for abating animal nuisances from disturbing a target flora of claim 18, wherein said decoy housing is formed having an outer aesthetic providing an impression by the live target animals of a predator animal, wherein said aesthetic is either a bust or an entire body and the predator animal is selected from a group comprising: a domestic dog; a wolf; a coyote; and a fox.

* * * * *

UNITED STATES PATENT AND TRADEMARK OFFICE
CERTIFICATE OF CORRECTION

PATENT NO. : 10,881,096 B1  
APPLICATION NO. : 16/021090  
DATED : January 5, 2021  
INVENTOR(S) : Sweeney et al.

Page 1 of 1

It is certified that error appears in the above-identified patent and that said Letters Patent is hereby corrected as shown below:

In the Specification

Correct Column 5, Lines 51-52 to read: --sensor 30. Upon initiation of the sensor 30 or from a signal received wirelessly from a nearby companion figure, an audible output from the speaker 50 may--

Correct Column 5, Line 59 to delete "56" and replace with --58--

Correct Column 5, Line 61 to delete "58" and replace with --26--

Correct Column 5, Line 62 to read: --after an initiation of an RF on/off switch 52 if only one system is in use and/or no signal is desired to be send upon time delay this switch can be shut off. Further controls may exist, such as an on/off--

Correct Column 5, Line 64 to read: --for manual testing of a selected control audio output. Further, a sensor sensitivity switch 56 may be used to increase or decrease, simultaneously, sensitivity of all sensors that are switched on by switches 60. It--

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*